United States Patent

[11] 3,596,554

| [72] | Inventors | George M. Low<br>Deputy Administrator of the National Aeronautics and Space Administration with Respect to an Invention of;<br>Ture E. Othman, Northridge, Calif.; Ervin P. Nelson, Malibu, Calif.; Lawrence J. Zmuda, Sepulveda, Calif. |
|---|---|---|
| [21] | Appl. No. | 38,814 |
| [22] | Filed | May 19, 1970 |
| [45] | Patented | Aug. 3, 1971 |

[54] SAFETY-TYPE LOCKING PIN
7 Claims, 1 Drawing Fig.

[52] U.S. Cl. ............................................. 85/5 B, 24/211 N
[51] Int. Cl. ....................................................... F16b 19/00
[50] Field of Search ............................................. 85/5, 5 B, 5 CP, 5 E, 5 M, 81; 24/211 N

[56] References Cited
UNITED STATES PATENTS

| 3,037,256 | 6/1962 | Chapman | 24/211 N |
| 3,233,496 | 2/1966 | De Pew et al. | 85/5 B |
| 3,243,837 | 4/1966 | Smith | 85/5 B |
| FOREIGN PATENTS | | | |
| 957,177 | 5/1964 | Great Britain | 85/5 B |
| 971,537 | 9/1964 | Great Britain | 85/5 B |

Primary Examiner—Marion Parsons, Jr.
Attorneys—L. D. Wofford, Jr., W. H. Riggins and John R. Manning ABSTRACT: A safety-type locking pin for joining two load-carrying members and including means for preventing removal of the pin unless the pin is free of load. A slidable plunger moves between a locked and unlocked position of the pin by plunger actuation of detent balls. The plunger is spring-urged toward the locked position. A handle on the end of the pin opposite the detent balls is slidable against a spring to a position that interferes with the plunger being maintained in the unlocked position that is necessary to remove the pin. However, if the pin is free of load, and thus withdraws easily from the joined members, the pin will withdraw from the members and the handle will not shift to the interferring position.

PATENTED AUG 3 1971
3,596,554
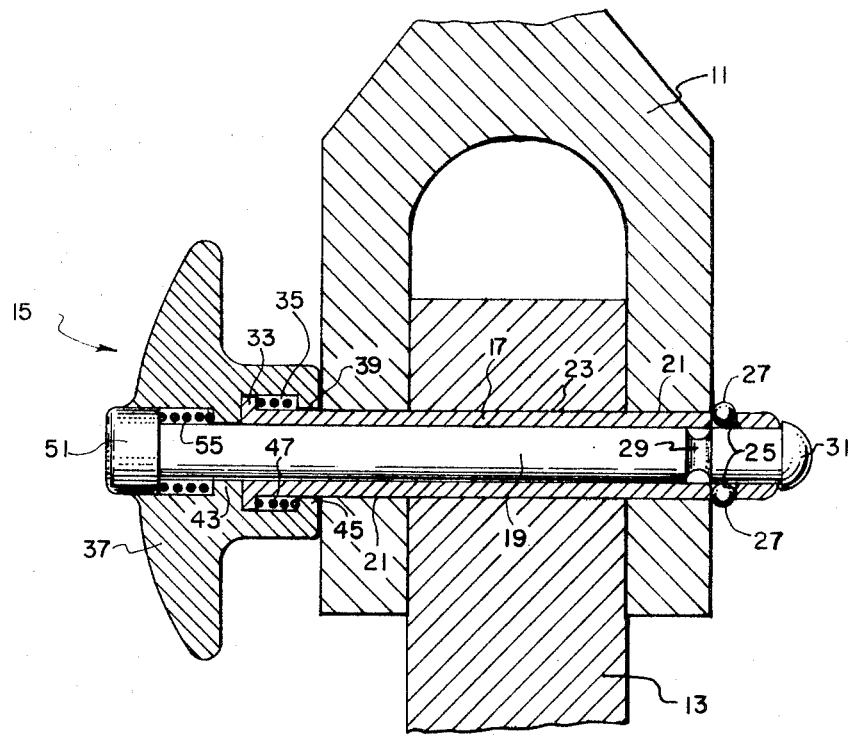
TURE E. OTHMAN
ERVIN P. NELSON
LAWRENCE J. ZMUDA
*INVENTORS*
BY
*Wayland H. Riggins*
ATTORNEY

SAFETY-TYPE LOCKING PIN

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

This invention relates generally to locking devices and more particularly to a safety-type locking pin for locking a plurality of members together such that withdrawal of the pin from the members is prevented unless the pin is substantially free of load.

Quick release locking pins are often used for joining two load-carrying members so that the members may be quickly connected or disconnected. Such pins are typically inserted through aligned holes in the two members being joined and incorporate a locking means whereby the pin cannot be withdrawn from the members until the locking means is released. An inherent safety hazard is present in the use of locking pins of this type in that if such a pin is withdrawn while the members are under load the members may quickly fail, swing or otherwise go out of control so as to endanger nearby personnel and equipment. This type of mishap is particularly apt to occur when a worker is in a hurry or does not perceive the risk of withdrawing the pin by forcing withdrawal even though the pin is under substantial load.

Conventional locking pins do not incorporate means for preventing hazardous withdrawal of locking pins from the members connected by the pins. As a safety precaution a locking pin is needed that is quickly and easily installed and withdrawn and includes means for preventing withdrawal of the pin under load conditions that are unsafe to the person manipulating the pin or to surrounding personnel and equipment.

SUMMARY OF THE INVENTION

The invention comprises a locking pin for joining two or more members. The pin comprises a longitudinal sleeve in which is disposed a slidable plunger that actuates a convention ball locking mechanism located near one end of the pin. The plunger is spring-urged toward the locked position and must be pressed to its unlocking position.

A handle is provided on the end of the pin opposite the ball locking mechanism. To unlock and withdraw the pin the handle must be pulled and the plunger must be simultaneously pressed. The handle is slidable against a spring to a position that prevents the plunger from being maintained in its pressed or unlocking position necessary for withdrawal of the pin from the members joined by the pin. However, if the pin is substantially free of load so that it is readily withdrawn from the members the handle will not slide against the spring to the position that interferes with unlocking function of the plunger.

Accordingly, it is a general object of the present invention to provide an improved locking pin.

A more specific object of the invention is to provide a locking pin for locking a plurality of load-bearing members together and which incorporates means for preventing withdrawal of the pin while the members are imposing a load on the locking pin.

Another object of the invention is to provide a locking pin that is easily and quickly installed and withdrawn from its locking position under safe load conditions but prevents withdrawal of the pin under unsafe load conditions.

These and other objects and advantages of the invention will become apparent upon reference to the following specification, attendant claims and the drawing.

BRIEF DESCRIPTION OF THE DRAWING

The single FIGURE shows a sectional view of the safety-type locking pin joining two members together and being in the locked position.

DESCRIPTION OF THE PREFERRED EMBODIMENT

Referring to the drawing, therein is shown the end portion of a first member 11 engaging the end portion of second member 13. The two members are connected by a locking pin designated generally at 15. The locking pin 15 comprises a sleeve 17 in which is slidably disposed a locking plunger 19. As is apparent, the sleeve 17 extends through holes 21 in the end portion of the member 11 and through a hole 23 in the end portion of the member 13.

At one end of the sleeve 17 are a plurality of apertures 25 in which are fitted detent balls 27. The plunger 19 has a groove 29 which corresponds to the spherical surface of the balls 27 so that when the groove 29 is in alignment or registration with the bills 27 the balls may retract into the groove and thereby permit withdrawal of the sleeve 17 from the members 11 and 13. End 31 of the locking plunger 19 near the groove 29 extends beyond the corresponding end of the sleeve 17 and is rounded and slightly enlarged so that the plunger cannot be withdrawn from the sleeve by leftward motion.

The end of the sleeve 17 opposite the locking balls 27 has an annular flange 33 that fits in an opening 35 of a handle 37. The handle 37 has a hold 39 therethrough that merges with the opening 35 and extends completely through the handle 37. The flange 33 of the sleeve 17 bears on an annular rib or shoulder portion 43 within the handle 37. The handle 37 also has a shoulder portion 45 at the end thereof which bears on the surface of the member 11. A compression spring 47 is positioned between the flange 33 of the sleeve 17 and the shoulder portion 45 of the handle 37.

The pushbutton end of the plunger 19 comprises an enlarged portion 51 which corresponds in diameter to the hole 39 in the handle 37. A compression spring 55 is positioned between the enlarged end 51 of the plunger 19 and the shoulder 43 of the handle 37 so that the plunger 19 is always spring-urged by the spring 55 toward its locked position as shown in the drawing. The sleeve 17, handle 37, springs 47, 55 and the plunger 19 are all disposed along a common longitudinal axis.

OPERATION

When it is desired to install the locking pin 15 in the openings 21 and 23 of the members 11 and 13, respectively, the plunger 19 is pressed inwardly against the spring 55 so that the locking balls 27 may retract into the groove 29. The sleeve 17 may then be inserted through the holes 21 and 23 and upon release of the plunger 19 and groove 29 will move out of registration with the locking balls 27 and thus lock the pin against withdrawal from the members 11 and 13. The holes 25 in the sleeve 17 are peened such that the balls 27 cannot escape outwardly through the holes.

When the pin is installed in the locking position shown in the drawing, the pin cannot be withdrawn if it is subjected to any substantial load. To withdraw the pin 15 from the members 11 and 13 it is necessary to press the plunger 19 so that the groove 29 will move into alignment with the balls 27. It is also necessary that the handle 37 be pulled simultaneously with the pressing of the plunger 19.

When the handle 37 is pulled to withdraw the pin the handle will slide away from the member 11 against the spring 47 unless the pin is free from load. As the handle 37 slides in this manner the rib 43 of the handle will press against the spring 55 which will in turn press against the enlarged end 51 of the plunger to slide the plunger out of alignment with the locking balls 27. This prevents retraction of the balls 27 and thus prevents withdrawal of the pin.

If the surface of the sleeve 17 is free of load and thus free of substantial friction then upon pressing the plunger 19 to the unlocking position and pulling the handle 37 the pin will easily slide out of the holes in the members 11 and 13 rather than the spring 47 being compressed by the handle. The amount of load friction needed to prevent withdrawal of the pin may be varied by varying the pressure necessary to compress the spring 47.

If it is attempted to defeat the safety feature of the pin by pressing the plunger 19 on the end 51 and driving the pin out of the members 11 and 13 by pushing or hitting the end opposite the handle 37, this would require contact with the end 31 of the plunger and would cause the plunger to slide to the locked position immediately. Therefore, the balls 27 cannot move into the groove 29 to unlock the pin if it is attempted to remove the pin by pushing or hitting upon the end 31 of the plunger 19.

We claim:

1. A safety-type locking pin for locking together a plurality of members having aligned holes therein comprising:
   a. a longitudinal sleeve adapted to be inserted in said aligned holes in said members;
   b. a plunger disposed in said sleeve and being slidable longitudinally of said sleeve;
   c. locking means carried by said sleeve and adapted for engaging one of said members and preventing withdrawal of said sleeve from said members;
   d. said locking means being movable in response to a sliding motion of said plunger between a locked and unlocked position;
   e. a handle carried by said sleeve on an end thereof remote from said locking means and being slidable longitudinally of said sleeve;
   f. resilient means for transferring longitudinally directed force between said handle and said sleeve;
   g. said plunger being spring-urged toward the locked position of said locking means;
   h. said handle being movable against said resilient means to a position whereby a portion of said handle prevents said plunger from being moved to the unlocked position of said locking means.

2. The invention as defined in claim 1 wherein said locking means comprises a plurality of apertures in the wall of said sleeve, a detent ball mounted in each of said apertures for projection and retraction laterally of said sleeve, a groove in said plunger for receiving said balls when said plunger is in said unlocked position of said locking means.

3. The invention as defined in claim 1 wherein said handle has an opening therethrough, said plunger extending through said opening, said end of said sleeve being disposed in said opening of said handle.

4. The invention as defined in claim 1 wherein said resilient means comprises a compression spring bearing on a portion of said handle and a portion of said sleeve.

5. The invention as defined in claim 1 wherein said plunger is spring-urged toward the locked position of said locking means by a compression spring bearing on a portion of said handle and a portion of said plunger.

6. The invention as defined in claim 1 wherein the end of said plunger opposite said handle projects beyond the corresponding end of said sleeve and is enlarged to a diameter exceeding the internal diameter of said sleeve.

7. The invention as defined in claim 1 wherein said handle, said plunger and said sleeve have a common longitudinal axis.